US008066506B2

(12) United States Patent
Boxwala et al.

(10) Patent No.: US 8,066,506 B2
(45) Date of Patent: Nov. 29, 2011

(54) MELT BALANCING ELEMENT IN A MANIFOLD MELT CHANNEL

(75) Inventors: Hakim Boxwala, Essex Junction, VT (US); Vijay Kudchadkar, Toronto (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 546 days.

(21) Appl. No.: 12/143,643

(22) Filed: Jun. 20, 2008

(65) Prior Publication Data

US 2008/0317896 A1 Dec. 25, 2008

Related U.S. Application Data

(60) Provisional application No. 60/945,859, filed on Jun. 22, 2007.

(51) Int. Cl.
B29C 45/17 (2006.01)

(52) U.S. Cl. ............... 425/572; 264/328.8; 264/328.12; 366/336

(58) Field of Classification Search .............. 425/185, 425/186, 192 R, 572; 264/328.8, 328.12; 366/336, 80
See application file for complete search history.

(56) References Cited

U.S. PATENT DOCUMENTS

| | | | |
|---|---|---|---|
| 2,672,653 A | 3/1954 | Simpkins et al. | |
| 3,696,840 A | 10/1972 | Odhner | |
| 3,940,224 A | 2/1976 | Armour | |
| 4,033,485 A | 7/1977 | Kohler | |
| 4,292,018 A | 9/1981 | Beale | |
| 4,299,553 A | 11/1981 | Swaroop | |
| 4,340,156 A | 7/1982 | Muller | |
| 4,403,933 A | 9/1983 | Davis et al. | |
| 4,443,178 A | 4/1984 | Fujita | |
| 4,563,149 A | 1/1986 | Landis | |
| 4,609,341 A | 9/1986 | Muller | |
| 5,192,556 A | 3/1993 | Schmidt | |
| 5,421,715 A | 6/1995 | Hofstetter et al. | |
| 5,683,731 A | 11/1997 | Deardurff et al. | |
| 5,688,462 A | 11/1997 | Salamon et al. | |
| 6,077,470 A | 6/2000 | Beaumont | |
| 6,196,822 B1 | 3/2001 | Blundy | |
| 6,235,230 B1 | 5/2001 | Puniello | |
| 6,348,171 B1 | 2/2002 | Dewar et al. | |
| 6,368,100 B1 | 4/2002 | Gunther | |
| 6,382,528 B1 | 5/2002 | Bouti | |
| 6,503,438 B2 | 1/2003 | Beaumont et al. | |
| 6,544,028 B2 | 4/2003 | Wright et al. | |
| 6,572,361 B2 | 6/2003 | Gould et al. | |

(Continued)

FOREIGN PATENT DOCUMENTS

CA 2047461 A1 1/1993

(Continued)

OTHER PUBLICATIONS

Beaumont, John P. et al., "Solving Mold Filling Imbalances in Multi-cavity Injection Molds", *Journal of Injection Molding Technology* Jun. 1998, vol. 2, No. 2, 47-58.

(Continued)

*Primary Examiner* — Maria Veronica Ewald
(74) *Attorney, Agent, or Firm* — Medler Ferro PLLC

(57) ABSTRACT

A manifold of an injection molding apparatus includes a primary melt channel and secondary melt channels extending from the primary melt channel. A shear rod is disposed at the junction between the primary and secondary melt channels. The shear rod extends from the junction into the primary melt channel and is disposed substantially parallel to the longitudinal axis of the primary melt channel.

22 Claims, 10 Drawing Sheets

U.S. PATENT DOCUMENTS

| | | |
|---|---|---|
| 6,776,600 B1 | 8/2004 | Zahoransky et al. |
| 6,923,638 B2 | 8/2005 | Chen |
| 7,115,226 B2 | 10/2006 | Olaru |
| 2002/0149135 A1 | 10/2002 | Choi et al. |
| 2004/0164459 A1 | 8/2004 | Babin et al. |
| 2004/0265422 A1 | 12/2004 | Sabin et al. |
| 2006/0054222 A1 | 3/2006 | Goinski |
| 2006/0261521 A1 | 11/2006 | Beaumont |

FOREIGN PATENT DOCUMENTS

| | | |
|---|---|---|
| DE | 2114465 A1 | 10/1972 |
| DE | 28 10 409 A1 | 9/1979 |
| EP | 0 162 412 A2 | 11/1985 |
| EP | 293756 A2 | 12/1988 |
| EP | 293756 A3 | 12/1988 |
| EP | 1 052 078 A1 | 11/2000 |
| JP | 57-015941 A | 1/1982 |

OTHER PUBLICATIONS

Blundy, John, "Improving Shear Induced Imbalance in Hot Runner Systems", *incoe Corporation article* Jun. 2004.

Gow, "Hot Runner with Variable Pressure Drop", www.ip.com Nov. 2001.

MELT BALANCING ELEMENT IN A MANIFOLD MELT CHANNEL

CROSS-REFERENCE TO RELATED APPLICATION

This application claims the benefit of U.S. provisional patent application No. 60/945,859 filed Jun. 22, 2007, which is hereby incorporated by reference in its entirety herein.

BACKGROUND OF THE INVENTION

1. Field of the Invention

This invention is relates generally to an injection molding apparatus and, more particularly, to a rod disposed in a manifold melt channel to balance filling of mold cavities.

2. Related Art

The use of manifolds in a hot runner injection molding apparatus is well known. Furthermore, it is well known that in many applications it is important that a runner layout be provided such that each cavity receives the same flow of melt having the same temperature and the same composition. Balancing of the runner system results in overall higher quality molded parts because consistency is achieved from mold cavity to mold cavity in a multi-cavity application. Even in multi-runner, single cavity applications, the benefits of balancing are well known and important.

A well-known technique for balancing a manifold is to match runner diameters and lengths and to match the number of turns in the runners, so that the pressure drop through the manifold to each cavity is the same. However, despite a runner layout having matched runner lengths and turns, unbalanced filling of cavities may occur at least partly due to a combination of shear heating of the melt flow combined with the layout of the runner system.

When melt is forced under pressure through a bore, as is done in a hot runner system, the melt experiences friction or shear in the area adjacent to the channel wall. This results in a localized elevation of the temperature of the melt. The result is a differential in temperature across the bore, with the center of the channel being cooler than the material closer to the bore. Due to this shear difference, the outside of the melt adjacent to the channel wall is less viscous than the center core of the melt. Many hot runner systems split the melt flow from a primary runner through two or more secondary runners. When the melt is split, the heat distribution profile in the melt is divided as well. This occurs because the flow through the runners is laminar, and therefore the shear-heated material remains adjacent to the wall as the corner is turned. After the corner, the heated peripheral portion is no longer annular, but is instead generally crescent-shaped and remains on one side of the melt flow. The mass flow through each of the secondary runners is substantially equal; however, the heated peripheral portion in each secondary runner is asymmetrically distributed about the periphery. If, as is usually the case, each secondary runner is divided into a plurality of tertiary runners, the asymmetric heated peripheral portion may be unequally divided between these plurality of tertiary runners. As a result, the material flowing into one of the tertiary runners from a secondary runner may include a higher proportion of shear-heated material compared to the melt flowing into the other of the tertiary runners downstream from that secondary runner. This phenomenon can, in some applications, cause preferential flow to some drop locations or mold cavities, and can cause poor part quality and out-of-spec product to be produced. Specifically, there will typically be preferential flow to the tertiary runner receiving a higher proportion of shear-heated material from its upstream secondary runner compared to the other of the tertiary runners fed by that secondary runner.

Previous methods of equalizing the flow include mixing or re-orienting the melt.

SUMMARY OF THE INVENTION

In an embodiment of the present invention, a manifold includes a primary melt channel, secondary melt channels extending from the primary melt channel, and tertiary melt channels extending from secondary melt channels, leading to nozzles and mold cavities. Melt balancing elements or shear rods are disposed at the junctions between primary melt channels and the secondary melt channels, and extend into the primary melt channels. Shear rods may also be disposed at the junctions between the second melt channels and the tertiary melt channels, and extending into the secondary melt channels.

In an embodiment, the shear rod is disposed in a bore in the manifold. The shear rod includes a rod portion and an enlarged head portion. The shear rod is disposed in the bore of the manifold such that the head portion abuts against a shoulder of the bore. A screw abuts a rear surface of head portion and includes a threaded outer surface that mates with a threaded inner surface of the bore. The screw further includes a shaped recess on a rear surface thereof to receive a tool for advancing or withdrawing the screw within the bore.

In another embodiment, the shear rod is brazed into the bore in the manifold.

In another embodiment, a bushing is disposed in the bore of the manifold. The bushing includes a shoulder that abuts against a shoulder of the bore. The bushing further includes a bore disposed therethrough. The shear rod includes a rod portion and an enlarged head portion. The head portion of the shear rod is disposed outside of bore and is retained in an actuator. The rod portion of the shear rod extends from the head portion, through the bore in the bushing, and into the melt channel. The actuator can be used to move the shear rod to different positions within the melt channel.

In another embodiment, a bushing is disposed in the bore in the manifold. The bushing includes a rearward facing recess including threads disposed on an interior surface of the recess. A holder is disposed within the rearward facing recess of the bushing, and includes a rearward facing shaped recess that is shaped such that a tool can be used to turn the holder. The holder further includes threads on an outside surface thereof to mate with the threads on the inside surface of the recess of the bushing. The holder further includes a forward facing recess that is shaped to retain a head portion of a shear rod. The shear rod further includes a rod portion that extends from the head portion, out of the holder, through a bore in the bushing, and into the melt channel. Using a tool to turn holder, the shear rod can be moved further in or out of melt channel.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
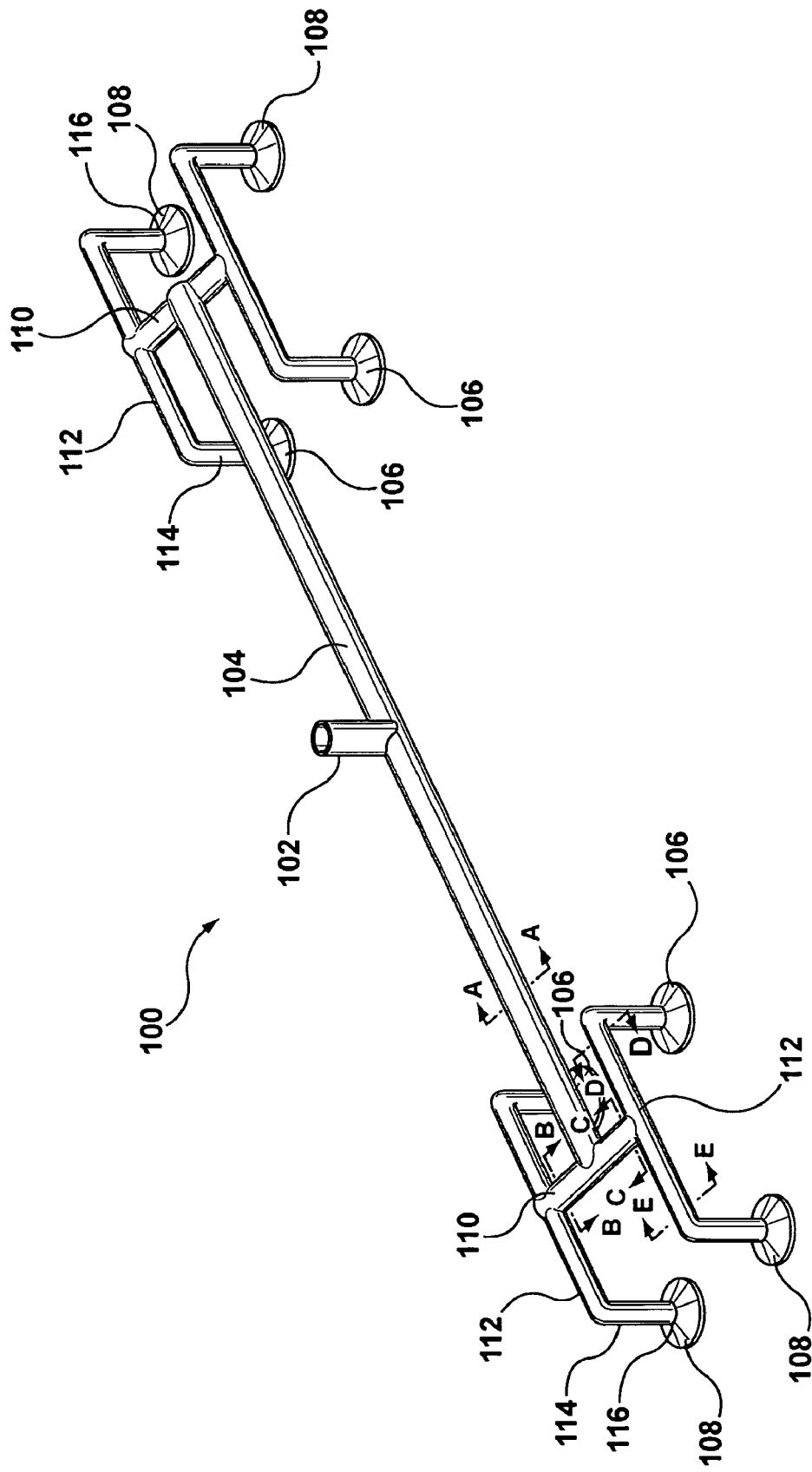
FIG. 1 is a schematic illustration of a portion of a conventional injection molding apparatus.

FIG. 1 shows a schematic illustration of a portion of a conventional injection molding apparatus 100. In particular, injection molding apparatus includes an inlet 102, a primary manifold melt channel 104, secondary manifold melt channels 110, and tertiary manifold melt channel 112. Tertiary manifold melt channels 112 deliver melt to interior and exterior cavities 106, 108 through drops 114 and nozzle 116. It would be understood by those of ordinary skill in the art that FIG. 1, and other schematic illustrations like it in the present application, are schematic in nature such that the melt channels are shown as tubes, whereas they are conventionally formed as bores or channels in a heated manifold. Accordingly, other well-known components of an injection molding apparatus, such as a heated manifold, back plate, mold plates, mold gates, etc. are not shown for convenience, although they would be apparent to one of ordinary skill in the art.

Figure 2:
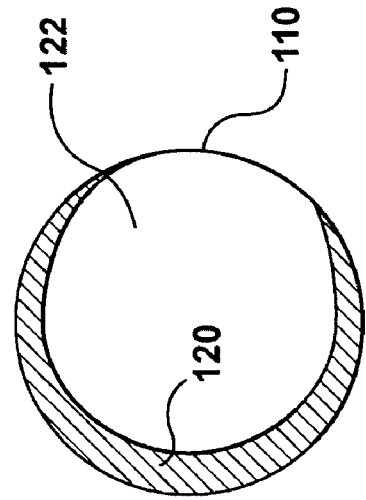
FIG. 2 is a cross-sectional view taken along line A-A of FIG. 1.

A discussed above, melt experiences friction or shear in the area adjacent to the channel wall, leading to an increased temperature and decreased viscosity of the melt as compared to the core of the melt. The melt adjacent the channel wall is also in direct contact with the heated manifold, further contributing to the temperature differential between the melt adjacent the channel wall and the melt in the central portion of the melt channel. FIG. 2 illustrates this phenomenon, illustrating a section taken along line A-A of primary manifold melt channel 104 of FIG. 1. A heated peripheral portion 120 of the melt around the inner wall of the primary manifold melt channel 104 is shown by cross-hatching. Core portion 122 of the melt has a higher viscosity as compared to peripheral portion 120. As can be seen in FIG. 2, the hotter melt adjoining the channel wall is substantially uniformly distributed about the channel wall.

Figure 3:
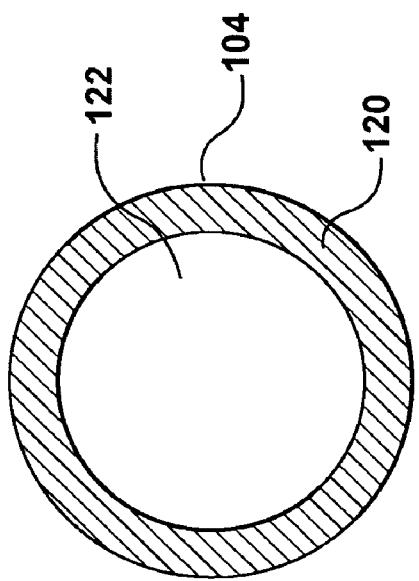
FIG. 3 is a cross-sectional view taken along line B-B of FIG. 1.
Figure 4:
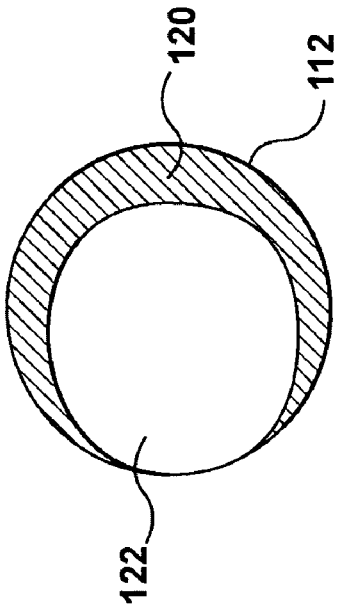
FIG. 4 is a cross-sectional view taken along line C-C of FIG. 1.

However, when the melt splits into secondary manifold melt channels 110, the heated peripheral portion 120 of the flow is divided into two, and each of these halves of the heated periphery 120 then flows into the secondary manifold melt channels 110. FIGS. 3 and 4 illustrate sectional views of the melt flow at sections B-B and C-C in the secondary melt channels 110 of FIG. 1. As shown in FIGS. 3 and 4, in the secondary melt channels 110, the heated periphery 120 is no longer substantially uniformly distributed about the channel wall. Instead, the portion of the channel wall that is closer to the side at which the primary melt channel 104 connects to the secondary melt channel 110 receives most of the heated periphery 120 from the primary melt channel 104. Consequently, this side of the secondary melt channel 110 (the interior side in FIG. 1) will have more heated melt than the opposite side of the secondary melt channel 110. However, as both secondary melt channels 110 receive substantially the same proportions of heated melt 120 and the relatively unheated melt 122, there will be substantially equal mass flow through the two secondary melt channels 110. This will not, necessarily, be the case where the secondary melt channels 110 branch into the tertiary melt channels 112.

Figure 5:
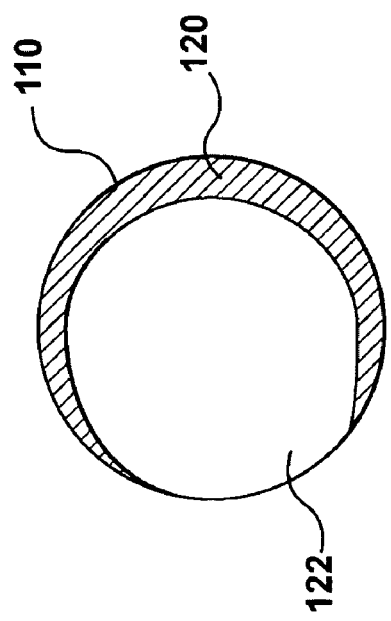
FIG. 5 is a cross-sectional view taken along line D-D of FIG. 1.
Figure 6:
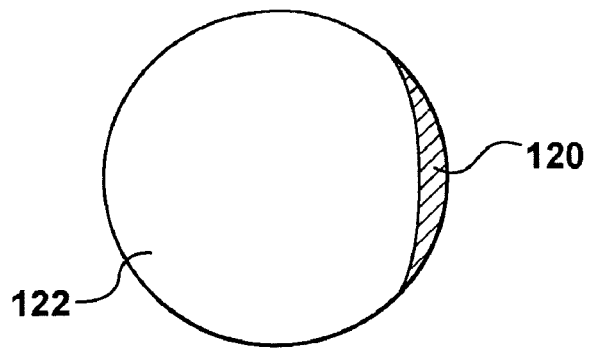
FIG. 6 is a cross-sectional view taken along line E-E of FIG. 1.

FIGS. 5 and 6 illustrate the downstream consequences of dividing the asymmetric flow from the secondary melt channels 110. FIG. 5 illustrates the sectional view of tertiary melt channel 112 taken along line D-D of FIG. 1. As FIG. 5 illustrates, this portion of tertiary melt channel 112 receives a disproportionate share of the heated peripheral melt 120, while the sectional view E-E shown in FIG. 6 indicates that the portion of tertiary melt channel 112 in the opposite branch receives substantially less of the heated peripheral melt 120. The heated melt 120 moves easier or faster as it is less viscous. As a result, interior cavities 106 receive more melt than cavities 108.

Figure 7:
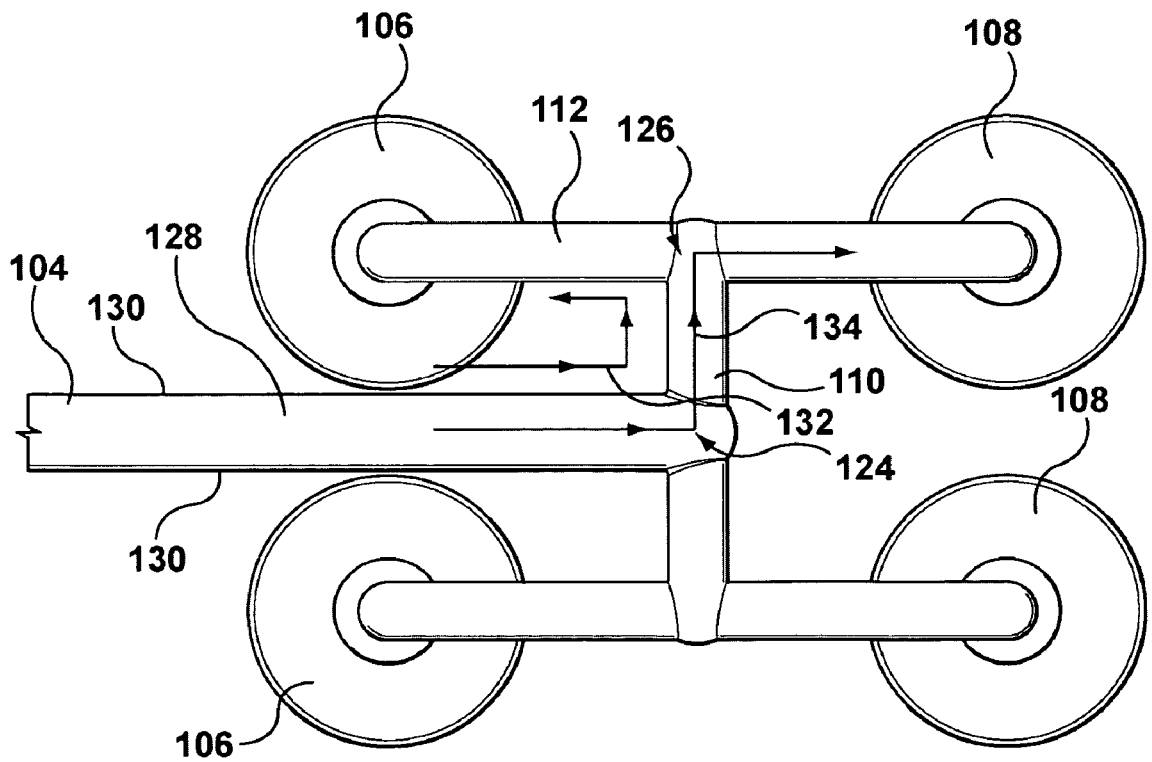
FIG. 7 is a schematic top view of a portion of the injection molding apparatus of FIG. 1.

FIG. 7 shows a top view of a portion of injection molding apparatus 100 of FIG. 1. Arrow 132 shows that more of the high shear, low viscosity melt 130 in primary melt channel 104 travels to interior cavities 106, and arrow 134 shows that more of the low shear, high viscosity melt 128 travels to exterior cavities 108, as explained above. This causes interior cavities 106 to fill faster than exterior cavities 108 as the melt splits at first T-split 124 and second T-split 126.

Figure 8:
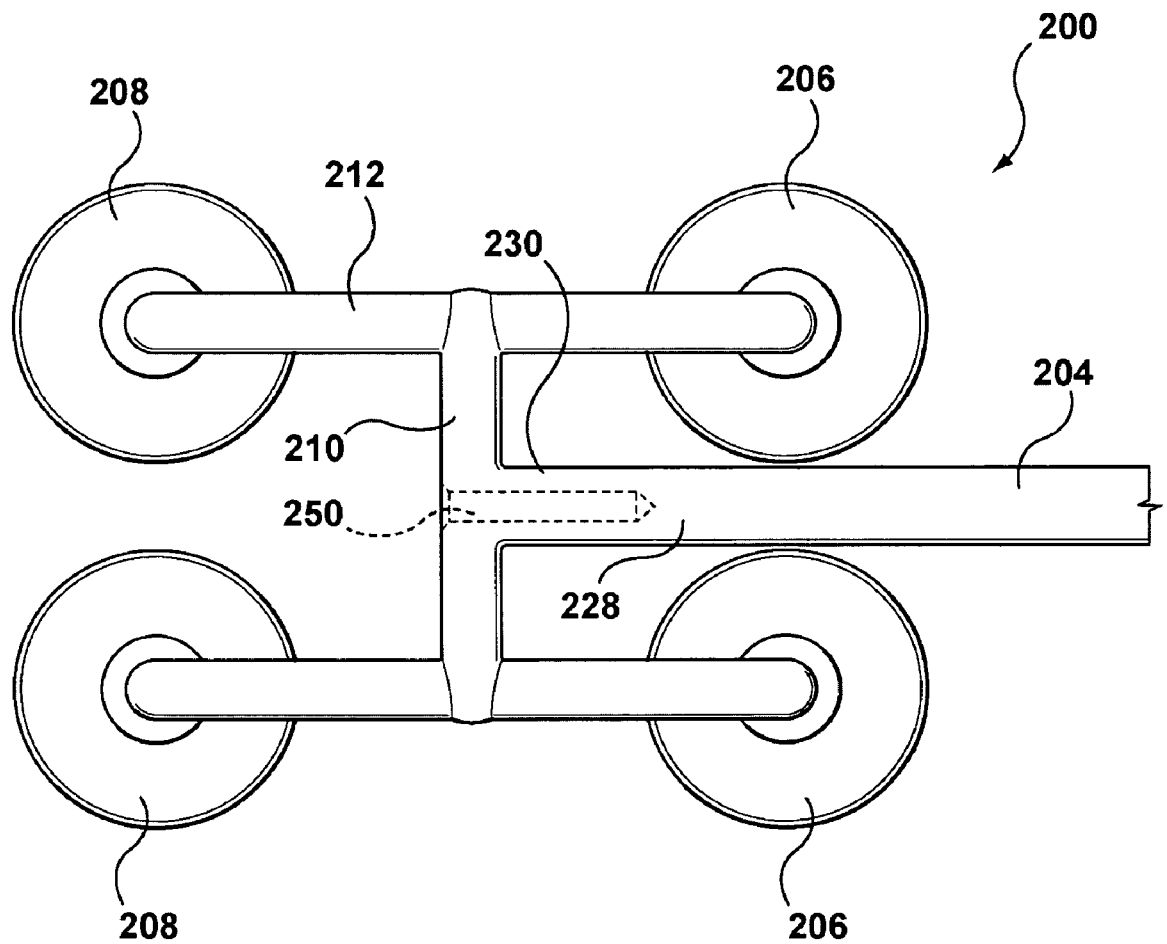
FIG. 8 is a schematic top view of a portion of an injection molding apparatus in accordance with an embodiment of the present invention.

FIG. 8 illustrates a schematic top view of a portion of an injection molding apparatus 200 in accordance with an embodiment of the present invention. It would be understood by those of ordinary skill in the art that FIG. 8 is schematic in nature such that the melt channels are shown as tubes, whereas they are conventionally formed as bores or channels in a heated manifold. Accordingly, other well-known components of an injection molding apparatus, such as a heated manifold, back plate, mold plates, mold gates, etc. are not shown for convenience, although they would be apparent to one of ordinary skill in the art. Injection molding apparatus 200 is similar to injection molding apparatus 100 shown in FIGS. 1 and 7, except that a shear rod 250 is disposed where a primary melt channel 204 meets a secondary melt channel 210. Due to shear rod 250, low shear, high viscosity melt 228 at the core of the melt stream is divided and shear is induced as the melt surrounds shear rod 250. Thus, when the melt divides or splits at secondary melt channel 210, high shear, low viscosity melt 230 is located on both sides of secondary melt channel, leading to a more equalized filling of interior cavities 206 and exterior cavities 208, as will be explained in more detail below.

Figure 9:
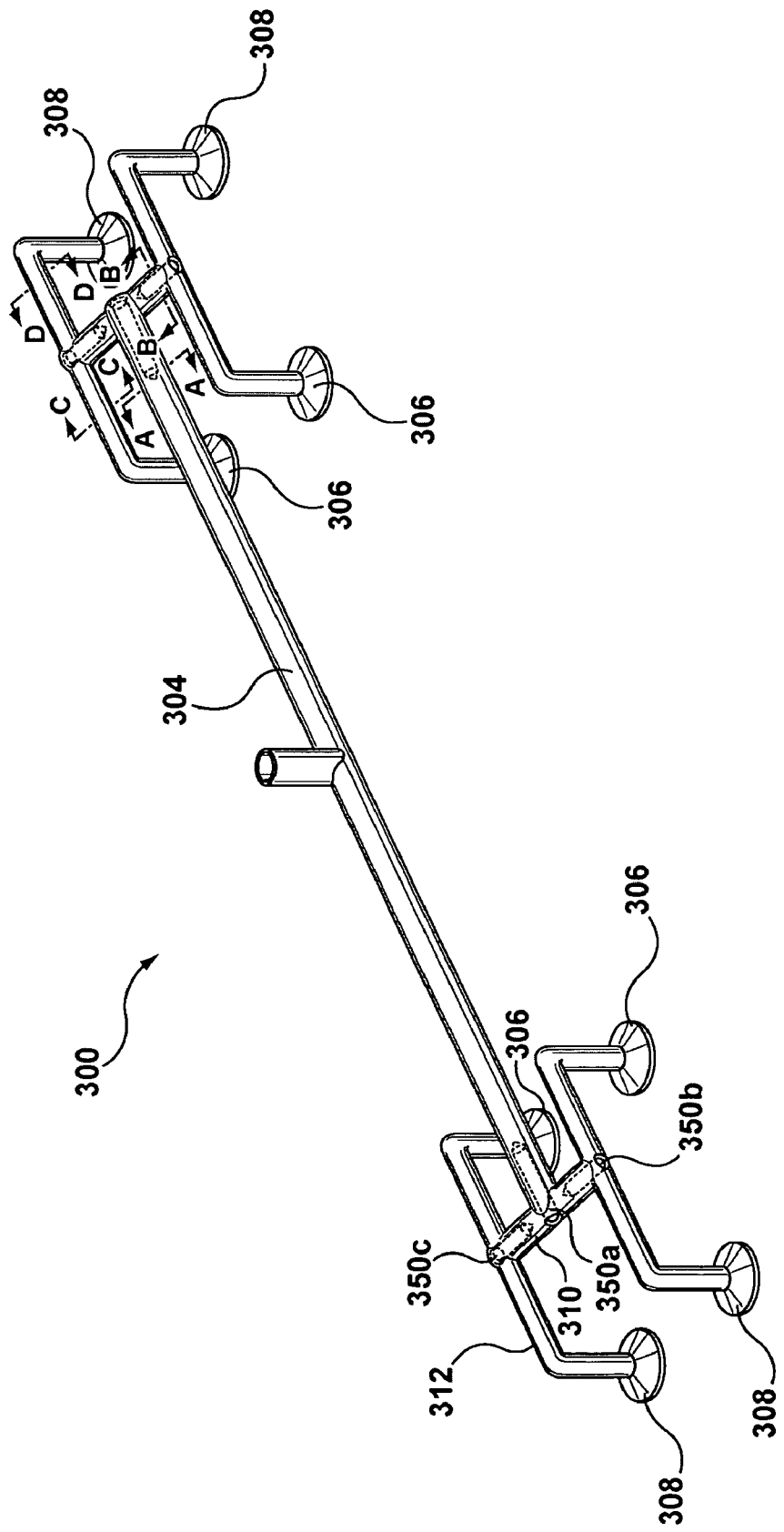
FIG. 9 is a schematic, perspective view of an injection molding apparatus in according with embodiment of the present invention.

FIG. 9 is a schematic illustration of a portion of an injection molding apparatus 300 in accordance with another embodiment of the present invention. It would be understood by those of ordinary skill in the art that FIG. 9 is schematic in nature such that the melt channels are shown as tubes, whereas they are conventionally formed as bores or channels in a heated manifold. Accordingly, other well-known components of an injection molding apparatus, such as a heated manifold, back plate, mold plates, mold gates, etc. are not shown for convenience, although they would be apparent to one of ordinary skill in the art. Injection molding apparatus 300 shown in FIG. 9 is similar to injection molding apparatus 100 shown in FIGS. 1 and 7, except that shear rods 350 are disposed where primary melt channels 304 meet secondary melt channels 310 and where secondary melt channels 310 meet tertiary melt channels 312. Shear rod 350a extends from the T-connection where primary melt channels 304 meets secondary melt channels 310 into primary melt channels 304. Shear rods 350b and 350c extend from the T-connections where secondary melt channels 310 meet tertiary melt channels 312 into secondary melt channels 310.

Without actively adding heat (i.e. using a heated rod or a heater) the shear rod reduces the temperature differential within the melt by imposing additional shearing to the inner portion of the melt within the melt channel prior to the junction wherein the melt is split and enters another melt channel. The shear rod is a simple and cost effective device, if a heater was used additional wiring, temperature sensors and additional control zones would be required. The shear rod is easily integrated into any new or existing manifold.

Figure 11:
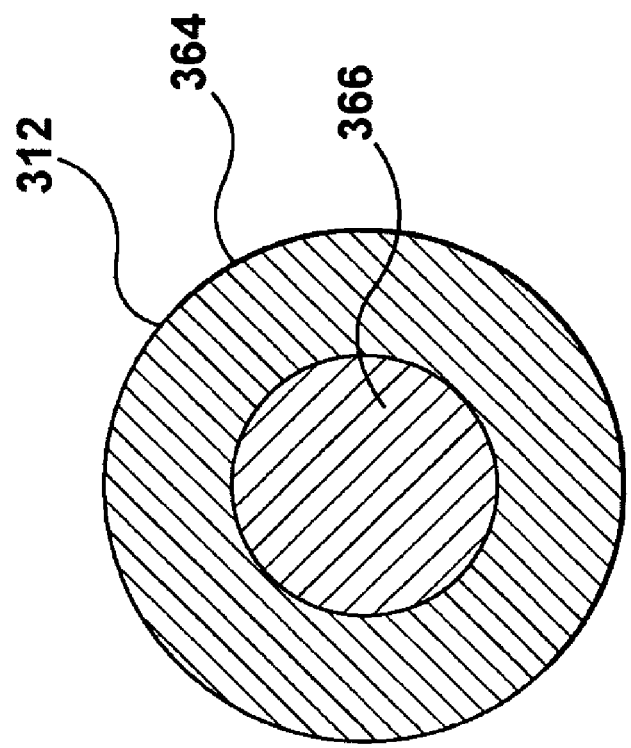
FIG. 11 is a cross-sectional view taken along line C-C or D-D of FIG. 9.
Figure 10:
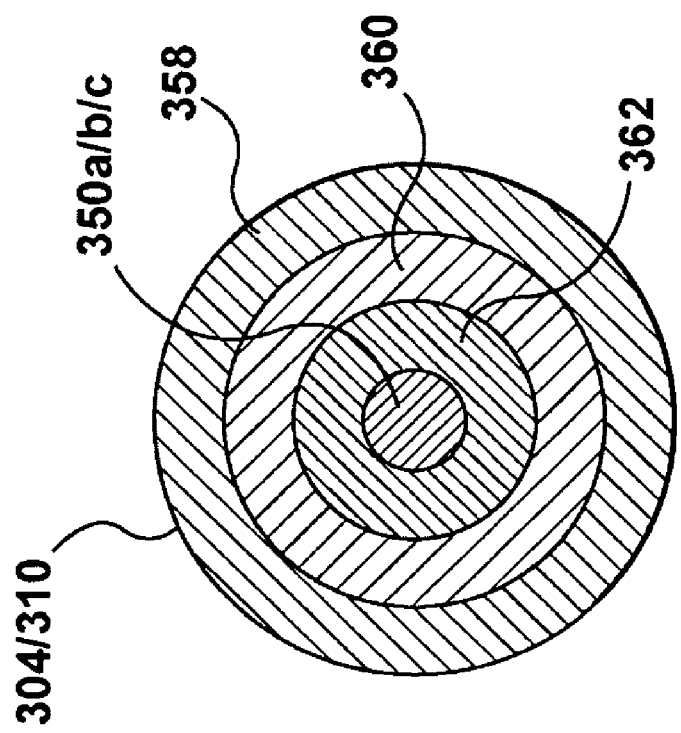
FIG. 10 is a cross-sectional view taken along line A-A or B-B of FIG. 8.

FIGS. 10 and 11 show generally the result of using shear rods 350 in primary and secondary melt channels 304, 310. FIG. 10 shows a sectional view taken along lines A-A or B-B of FIG. 9. The melt in melt channel 304/310 divides around shear rod 350a/350b/350c such that an outer layer 358 of shear material is disposed adjacent to the walls of the channel 304/310, an inner layer 362 of shear material is disposed adjacent to the rod 350a/350b/350c and an intermediate layer 360 of relatively unsheared material is disposed between outer layer 358 and inner layer 362. In this manner, when the melt divides, the sheared material is more equalized around the channel than without a shear rod, as shown in FIG. 11. FIG. 11 shows a section view taken along lines C-C or D-D of FIG. 9, with sheared material 64 more equalized around unsheared material 66. Such a configuration equalizes flow into interior and exterior cavities 306, 308 to reduce filling imbalances.

Figure 12:
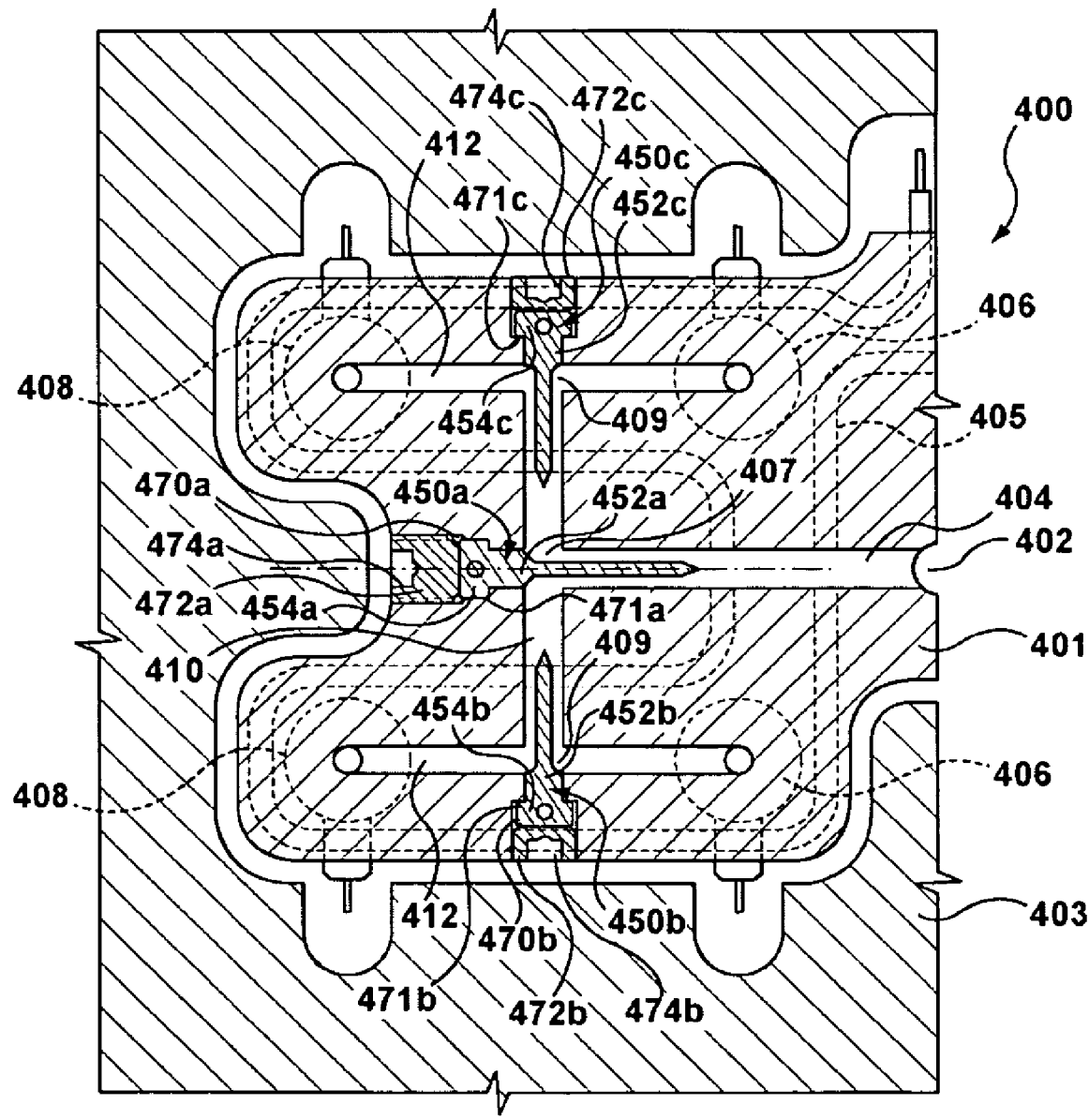
FIG. 12 is a cross-sectional view if a portion of an injection molding apparatus in accordance with an embodiment of the present invention.

FIG. 12 illustrates a portion of an injection molding apparatus 400 with shear rods 450 disposed in melt channels 404, 410. As in the embodiments discussed above, injection molding apparatus 400 includes a manifold 401 including an inlet 402, a primary melt channel 404, secondary melt channels 410 extending from primary melt channel 404 at a junction 407, and tertiary melt channels 412 extending from secondary melt channels 410 at junctions 409. Tertiary melt channels 412 align with melt channels in nozzles (not shown) and the nozzle melt channels align with mold gates to lead melt into interior and exterior mold cavities 406, 408. Manifold 401 is surrounded by mold plates 403 as would be understood by one of ordinary skill in the art. Manifold 401 is heated by a heater 405, which may be an electric heater disposed in a groove in a surface of manifold 401, or any other type of heater used in an injection molding apparatus.

Shear rods 450a, 450b, and 450c shown in FIG. 12 are identical in structure. Therefore, only shear rod 450a will be described in detail, although the reference numerals for shear rods 450b and 450c are identical to those for shear rod 450a except for the suffixes "a", "b", and "c". Shear rod 450a is disposed in a bore 470a in manifold 401 facing primary melt channel 404. Bore 470a includes a shoulder 471a. Shear rod 450a includes a rod portion 452a and an enlarged head portion 454a. Shear rod 450a is disposed in bore 450a such that head portion 454a abuts against shoulder 471a when shear rod is fully inserted into bore 470a. A screw 472a abuts a rear surface of head portion 454a. Screw 472a includes a threaded outer surface that mates with a threaded inner surface of bore 470a. Screw 472a further includes a shaped recess 474a on a rear surface thereof shaped to receive a tool for advancing or withdrawing screw 472a within bore 470a. With this arrangement shear rod 450a may be easily replaced with a shear rod having a longer or shorter rod portion 452a or a larger or smaller head portion 454a to adjust the position of rod portion 452a within primary melt channel 404.

Figure 13:
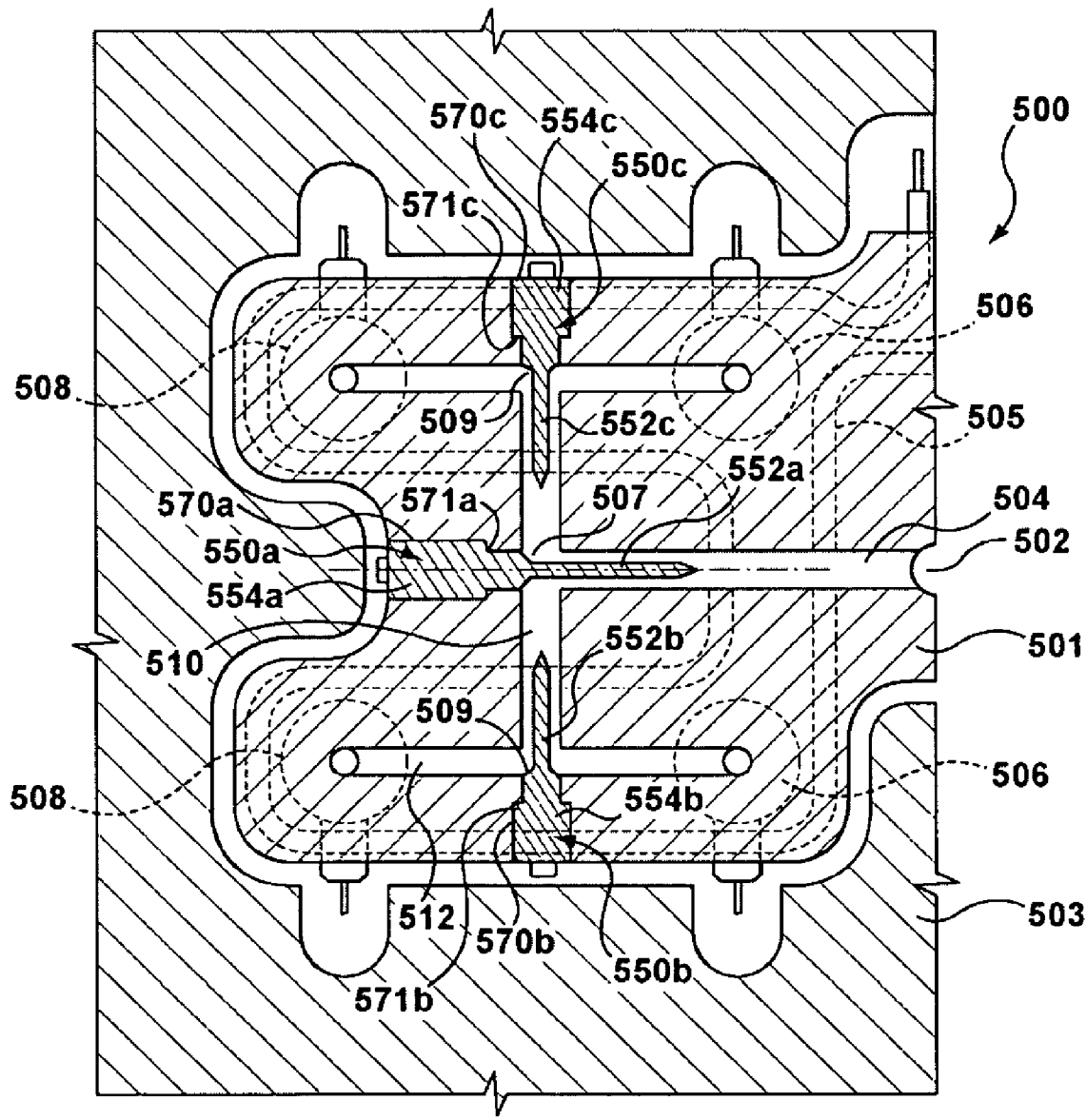
FIG. 13 is a cross-sectional view if a portion of an injection molding apparatus in accordance with an embodiment of the present invention.

FIG. 13 illustrates a portion of an injection molding apparatus 500 with another embodiment of shear rods 550 disposed in melt channels 504, 510. As in the embodiments discussed above, injection molding apparatus 500 includes a manifold 501 including an inlet 502, a primary melt channel 504, secondary melt channels 510 extending from primary melt channel 504 at a junction 507, and tertiary melt channels 512 extending from secondary melt channels 510 at junctions 509. Tertiary melt channels 512 align with melt channels in nozzles (not shown) and the nozzle melt channels align with mold gates to lead melt into interior and exterior mold cavities 506, 508. Manifold 501 is surrounded by mold plates 503 as would be understood by one of ordinary skill in the art. Manifold 501 is heated by a heater 505, which may be an electric heater disposed in a groove in a surface of manifold 501, or any other type of heater used in an injection molding apparatus.

Shear rods 550a, 550b, and 550c shown in FIG. 13 are identical in structure. Therefore, only shear rod 550a will be described in detail, although the reference numerals for shear rods 550b and 550c are identical to those for shear rod 550a except for the suffixes "a", "b", and "c". Shear rod 550a is disposed in a bore 570a in manifold 501 facing primary melt channel 504. Bore 570a includes a shoulder 571a. Shear rod 550a includes a rod portion 552a and an enlarged head portion 554a. Shear rod 550a is disposed in bore 570a such that head portion 554a abuts against shoulder 571a when shear rod is fully inserted into bore 570a. Shear rod 550a is brazed into bore 570a to maintain a firm connection to manifold 501.

Figure 14:
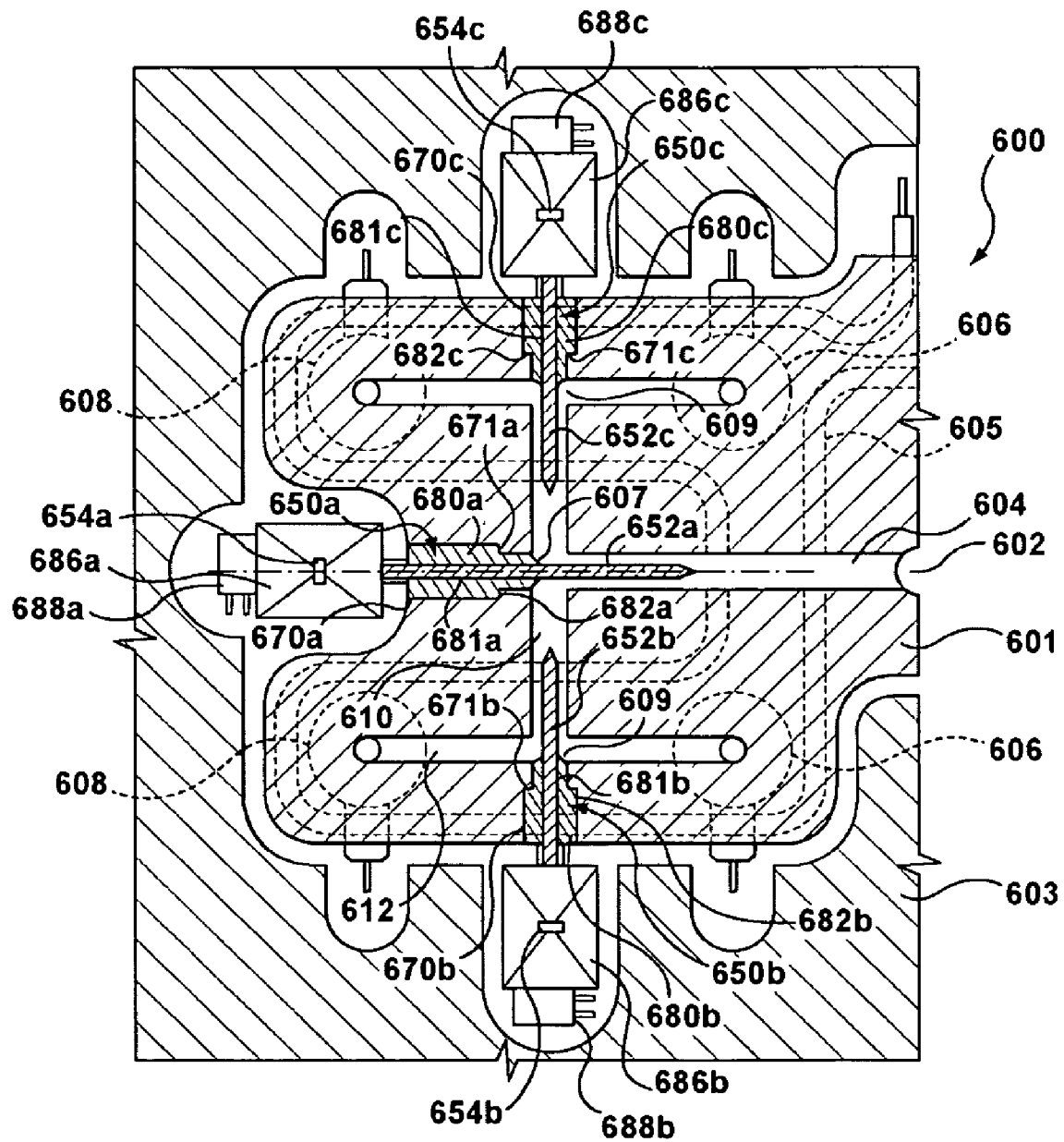
FIG. 14 is a cross-sectional view if a portion of an injection molding apparatus in accordance with an embodiment of the present invention.

FIG. 14 illustrates a portion of an injection molding apparatus 600 with another embodiment of shear rods 650 disposed in melt channels 604, 610. As in the embodiments discussed above, injection molding apparatus 600 includes a manifold 601 including an inlet 602, a primary melt channel 604, secondary melt channels 610 extending from primary melt channel 604 at a junction 607, and tertiary melt channels 612 extending from secondary melt channels 610 at junctions 609. Tertiary melt channels 612 align with melt channels in nozzles (not shown) and the nozzle melt channels align with mold gates to lead melt into interior and exterior mold cavities 606, 608. Manifold 601 is surrounded by mold plates 603 as would be understood by one of ordinary skill in the art. Manifold 601 is heated by a heater 605, which may be an electric heater disposed in a groove in a surface of manifold 601, or any other type of heater used in an injection molding apparatus.

Shear rods 650a, 650b, and 650c shown in FIG. 14 are identical in structure. Therefore, only shear rod 650a will be described in detail, although the reference numerals for shear rods 650b and 650c are identical to those for shear rod 650a except for the suffixes "a", "b", and "c". A bore 670a is provided in manifold 601 facing primary melt channel 604. Bore 670a houses the shear rod assembly and includes a shoulder 671a. A plug or bushing 680a is disposed in bore 670a. Bushing 680a includes a shoulder 682a that abuts shoulder 671a of bore 670a. Bushing 680a further includes a bore 681a disposed therethrough. Shear rod 650a includes a rod portion 652a and a head portion 654a. A portion of rod portion 652a is disposed within bore 681a of bushing 680a and extends into primary melt channel 604. Head portion 654a of shear rod 650a is disposed outside of bore 670a and is retained in an actuator 686a. Actuators are known in the art for moving valve pins. Such an actuator can be used to move shear rod 650a to different positions within primary melt channel 604, depending on the application. Actuator 686a shown in FIG. 13 is an electric actuator including electrical leads 688a, however, one of ordinary skill in the art would understand that any actuator can be used, such as a pneumatic, hydraulic, or any other known kind.

Figure 15:
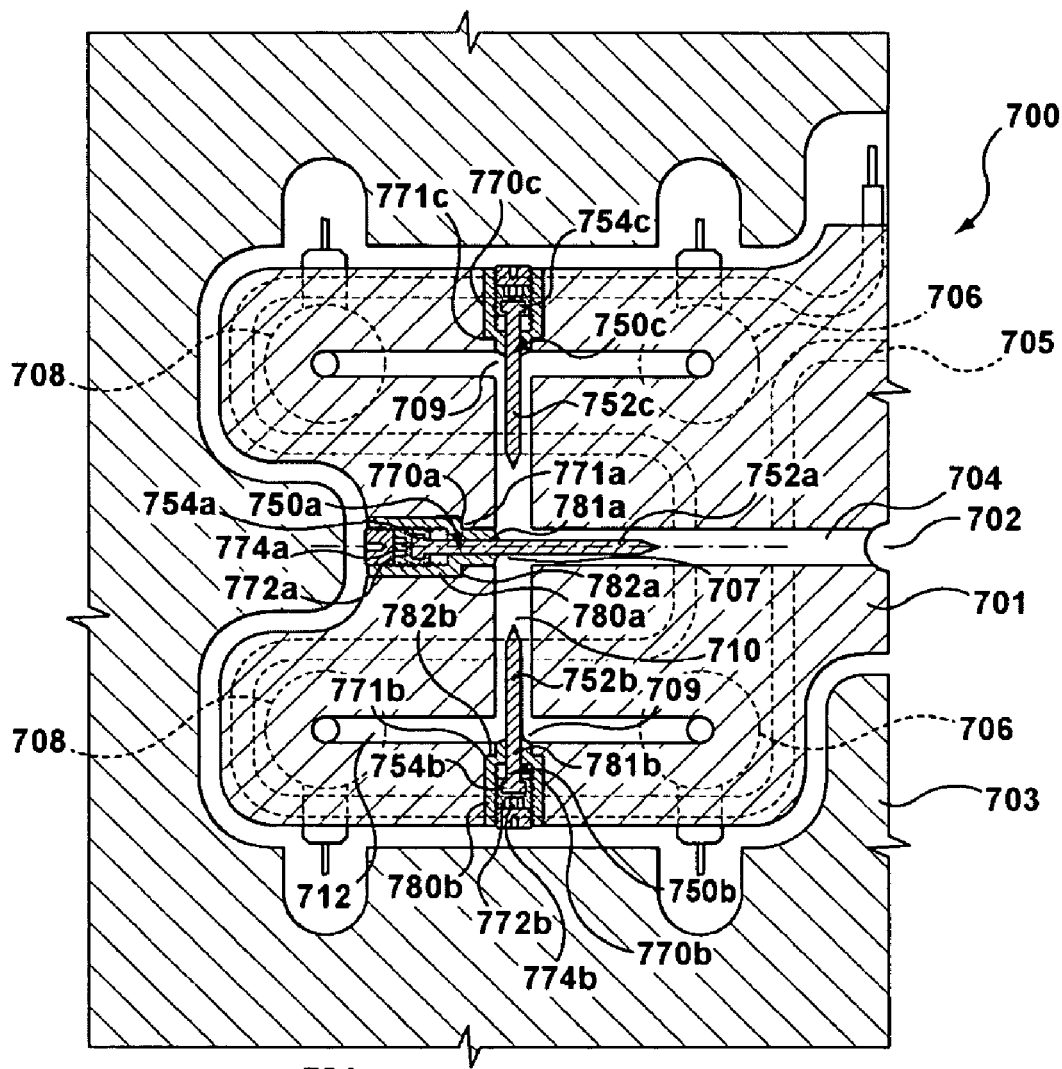
FIG. 15 is a cross-sectional view if a portion of an injection molding apparatus in accordance with an embodiment of the present invention.

FIG. 15 illustrates a portion of an injection molding apparatus 700 with another embodiment of shear rods 750 disposed in melt channels 704, 710. As in the embodiments discussed above, injection molding apparatus 700 includes a manifold 701 including an inlet 702, a primary melt channel 704, secondary melt channels 710 extending from primary melt channel 704 at junction 707, and tertiary melt channels 712 extending from secondary melt channels 710 at junctions 709. Tertiary melt channels 712 align with melt channels in nozzles (not shown) and the nozzle melt channels align with mold gates to lead melt into interior and exterior mold cavities 706, 708. Manifold 701 is surrounded by mold plates 703 as would be understood by one of ordinary skill in the art. Manifold 701 is heated by a heater 705, which may be an electric heater disposed in a groove in a surface of manifold 701, or any other type of heater used in an injection molding apparatus.

Figure 15A:
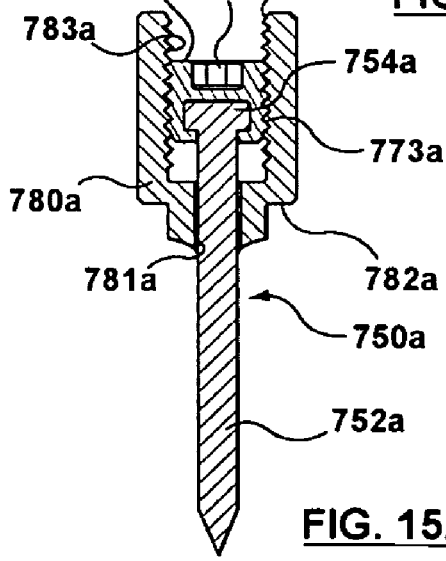
FIG. 15A is an enlarged, cross-sectional view of a portion of FIG. 15.
Figure 15B:
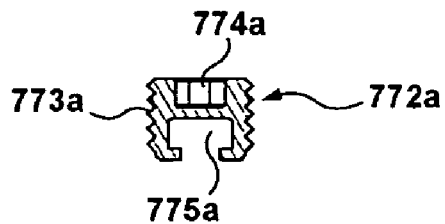
FIG. 15B is an enlarged, cross-sectional view of a portion of FIG. 15A.

Shear rods 750a, 750b, and 750c shown in FIG. 15 are identical in structure. Therefore, only shear rod 750a will be described in detail, although the reference numerals for shear rods 750b and 750c are identical to those for shear rod 750a except for the suffixes "a", "b", and "c". A bore 770a is provided in manifold 701 facing primary melt channel 704. Bore 770a includes a shoulder 771a. A plug or bushing 780a is disposed in bore 770a. Bushing 780a includes a shoulder 782a that abuts shoulder 771a of bore 770a. Bushing 780a further includes a rearward facing recess 784a including threads 783a disposed on an interior surface of recess 784a. A holder 772a is disposed within rearward facing recess 784a of bushing 780a. Holder 772a includes a rearward facing shaped recess 774a that is shaped such that a tool can be used to turn holder 772a. Holder 772a further includes threads 773a on an outside surface thereof. Threads 773a mate with threads 783a on an interior surface of rearward facing recess 784a of bushing 780a. Holder 772a further includes a forward facing recess that is shaped to retain a head portion 754a of shear rod 750a. Shear rod 750a further includes a rod portion 752a that extends from head portion 754a, out of holder 772a, through a bore 781a in bushing 780a, and into primary melt channel 704. Using a tool to turn holder 772a, shear rod 750a can be moved further in or out of primary melt channel 704, depending on the particular application. Detailed views of shear rod 750a, bushing 780a, and holder 772a are shown in FIGS. 15A and 15B.

The shear rods described in the above embodiments may be made of any suitable material used in an injection molding apparatus, some examples are tool steel, stainless steel, TZM, titanium, ceramic, and tungsten carbide. It is possible that the material for the shear rod could be chosen to best suit the application, for example for its wear resistance properties to last longer when an aggressive resin, for example a glass filled resin, is to be molded; or perhaps the rod could be made of a more thermally conductive material than the manifold to improve the heat transfer from the manifold into the melt channel; or if additional heat is not needed a less conductive material could be used. The bushings and holder described in the above embodiments may be also be made of any suitable materials used in an injection molding apparatus, such as tool steel, stainless steel, titanium, ceramic, etc. depending on the particular application.

Although a particular embodiment of the shear rod has been used in each embodiment described, one of ordinary skill in the art would recognize that within a particular manifold, different embodiments of the shear rods may be used. For example, it may be contemplated that a particular shear rod within the manifold could be fixed and would not have to be moved. Thus, such a rod may be brazed into the bore in the manifold, as described with respect to FIG. 13. However, it may be advantageous for other shear rods within the manifold to be moveable. Thus, the embodiment described in FIG. 14 or 15, for example, may be used.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A manifold for an injection molding apparatus comprising:
    a primary melt channel disposed upstream of at least two secondary melt channels extending directly from the primary melt channel at a primary junction, the primary melt channel having a primary melt channel longitudinal axis;
    a shear rod disposed at the primary junction between the primary and secondary melt channels, wherein the shear rod extends from the primary junction into the primary melt channel and is disposed substantially parallel to the primary melt channel longitudinal axis;
    an annular melt channel disposed around the shear rod in the primary melt channel, wherein an annular melt channel longitudinal axis is substantially parallel to the primary melt channel longitudinal axis.

2. The manifold of claim 1, wherein a longitudinal axis of the shear rod is coaxial with the primary melt channel longitudinal axis.

3. The manifold of claim 1, further comprising:
    at least a pair of tertiary melt channels extending from each secondary melt channel at secondary junctions;
    a second shear rod disposed at one of the secondary junctions between one of the secondary melt channels and the first pair of tertiary melt channels, wherein the second shear rod extends from the secondary junction into the secondary melt channel and is disposed substantially parallel to a longitudinal axis of the secondary melt channel; and
    a third shear rod disposed at the other secondary junction between the other secondary melt channel and the second pair of tertiary melt channels, wherein the third shear rod extends from the secondary junction into the secondary melt channel and is disposed substantially parallel to a longitudinal axis of the secondary melt channel.

4. A manifold for an injection molding apparatus comprising:
   a primary melt channel and secondary melt channels extending from the primary melt channel at a primary junction, the primary melt channel having a longitudinal axis;
   a shear rod disposed at the primary junction between the primary and secondary melt channels, wherein the shear rod extends from the primary junction into the primary melt channel and is disposed substantially parallel to the longitudinal axis of the primary melt channel; and
   a bore in the manifold facing the primary melt channel, wherein the bore includes a shoulder, wherein the shear rod includes a rod portion and a head portion, and wherein the shear rod is disposed in the bore such that the head portion abuts against the shoulder when the shear rod is fully inserted into the bore.

5. The manifold of claim 4, wherein the shear rod is brazed into the bore.

6. The manifold of claim 4, further comprising:
   a screw abutting a rear surface of the head portion, wherein the screw includes a threaded outer surface that mates with a threaded inner surface of the bore, and wherein the screw includes a shaped recess on a rear surface of the screw.

7. A manifold for an injection molding apparatus comprising:
   a primary melt channel and secondary melt channels extending from the primary melt channel at a primary junction, the primary melt channel having a longitudinal axis;
   a shear rod disposed at the primary junction between the primary and secondary melt channels, wherein the shear rod extends from the primary junction into the primary melt channel and is disposed substantially parallel to the longitudinal axis of the primary melt channel;
   a bore in the manifold facing the primary melt channel, wherein the bore includes a shoulder; and
   a bushing disposed in the bore, wherein the bushing includes a shoulder that abuts against the shoulder of the bore, and wherein the bushing includes a bushing bore disposed therethrough,
   wherein the shear rod includes a rod portion and a head portion, a portion of the rod portion being disposed within the bushing bore and extending into the primary melt channel, and the head portion being disposed outside of the bushing bore.

8. The manifold of claim 7, further comprising an actuator, wherein the head portion of the shear rod is coupled to the actuator such that actuator can move the shear rod to different positions within then primary melt channel.

9. The manifold of claim 7, wherein the bushing includes a rearward facing recess including threads disposed on an interior surface of the recess, further comprising:
   a holder disposed within the rearward facing recess of the bushing, the holder including,
      a rearward facing shaped recess that is shaped such that a tool can be used to turn then holder,
      threads disposed on an outside surface of the holder to mate with the threads on the interior surface of the bushing rearward facing recess,
      a forward facing recess that is shaped to retain the head portion of the shear rod,
   wherein turning the holder causes the shear rod to be moved further in or out of primary melt channel.

10. An injection molding apparatus comprising:
    a manifold including an inlet for receiving melt from a source, a primary melt channel, and at least two secondary melt channels downstream of the primary melt channel and extending directly from the primary melt channel at a primary junction, the primary melt channel having a primary melt channel longitudinal axis;
    a plurality of nozzles, wherein each nozzle includes a nozzle channel that is aligned with one of a plurality of outlets of the manifold to receive melt from the manifold;
    a plurality of cavities for receiving melt from the nozzle channels;
    a shear rod disposed at the primary junction between the primary and secondary melt channels, wherein the shear rod extends from the primary junction into the primary melt channel and is disposed substantially parallel to the primary melt channel longitudinal axis; and
    an annular melt channel disposed around the shear rod in the primary melt channel, wherein an annular melt channel longitudinal axis is substantially parallel to the primary melt channel longitudinal axis.

11. The injection molding apparatus of claim 10, wherein a longitudinal axis of the shear rod is coaxial with the primary melt channel longitudinal axis.

12. The injection molding apparatus of claim 10, further comprising:
    at least a pair of tertiary melt channels extending from each secondary melt channel at secondary junctions;
    a second shear rod disposed at one of the secondary junctions between one of the secondary melt channels and the first pair of tertiary melt channels, wherein the second shear rod extends from the secondary junction into the secondary melt channel and is disposed substantially parallel to a longitudinal axis of the secondary melt channel; and
    a third shear rod disposed at the other secondary junction between the other secondary melt channel and the second pair of tertiary melt channels, wherein the third shear rod extends from the secondary junction into the secondary melt channel and is disposed substantially parallel to a longitudinal axis of the secondary melt channel.

13. An injection molding apparatus comprising:
    a manifold including an inlet for receiving melt from a source, a primary melt channel, and secondary melt channels extending from the primary melt channel at a primary junction, the primary melt channel having a longitudinal axis;
    a plurality of nozzles, wherein each nozzle includes a nozzle channel that is aligned with one of a plurality of outlets of the manifold to receive melt from the manifold;
    a plurality of cavities for receiving melt from the nozzle channels;
    a shear rod disposed at the primary junction between the primary and secondary melt channels, wherein the shear rod extends from the primary junction into the primary melt channel and is disposed substantially parallel to the longitudinal axis of the primary melt channel; and
    a bore in the manifold facing the primary melt channel, wherein the bore includes a shoulder, wherein the shear rod includes a rod portion and a head portion, and wherein the shear rod is disposed in the bore such that the head portion abuts against the shoulder when the shear rod is fully inserted into the bore.

14. The injection molding apparatus of claim 13, wherein the shear rod is brazed into the bore.

15. The injection molding apparatus of claim 13, further comprising:
   a screw abutting a rear surface of the head portion, wherein the screw includes a threaded outer surface that mates with a threaded inner surface of the bore, and wherein the screw includes a shaped recess on a rear surface of the screw.

16. An injection molding apparatus comprising:
   a manifold including an inlet for receiving melt from a source, a primary melt channel, and secondary melt channels extending from the primary melt channel at a primary junction, the primary melt channel having a longitudinal axis;
   a plurality of nozzles, wherein each nozzle includes a nozzle channel that is aligned with one of a plurality of outlets of the manifold to receive melt from the manifold;
   a plurality of cavities for receiving melt from the nozzle channels;
   a shear rod disposed at the primary junction between the primary and secondary melt channels, wherein the shear rod extends from the primary junction into the primary melt channel and is disposed substantially parallel to the longitudinal axis of the primary melt channel;
   a bore in the manifold facing the primary melt channel, wherein the bore includes a shoulder; and
   a bushing disposed in the bore, wherein the bushing includes a shoulder that abuts against the shoulder of the bore, and wherein the bushing includes a bushing bore disposed therethrough,
   wherein the shear rod includes a rod portion and a head portion, a portion of the rod portion being disposed within the bushing bore and extending into the primary melt channel, and the head portion being disposed outside of the bushing bore.

17. The injection molding apparatus of claim 16, further comprising an actuator, wherein the head portion of the shear rod is coupled to the actuator such that actuator can move the shear rod to different positions within then primary melt channel.

18. The injection molding apparatus of claim 16, wherein the bushing includes a rearward facing recess including threads disposed on an interior surface of the recess, further comprising:
   a holder disposed within the rearward facing recess of the bushing, the holder including,
      a rearward facing shaped recess that is shaped such that a tool can be used to turn then holder,
      threads disposed on an outside surface of the holder to mate with the threads on the interior surface of the bushing rearward facing recess,
      a forward facing recess that is shaped to retain the head portion of the shear rod,
   wherein turning the holder causes the shear rod to be moved further in or out of primary melt channel.

19. The injection molding apparatus of claim 10, wherein the shear rod is not actively heated.

20. The injection molding apparatus of claim 10, wherein the shear rod is configured to impose additional shearing to an inner portion of the melt flowing within the primary melt channel prior to the primary junction.

21. The manifold of claim 1, wherein the shear rod is not actively heated.

22. The manifold of claim 1, wherein the shear rod is configured to impose additional shearing to an inner portion of melt flowing within the primary melt channel prior to the primary junction.

* * * * *